United States Patent Office 2,837,498
Patented June 3, 1958

2,837,498

XYLYLENE DIISOCYANATE MODIFIED POLYESTERS

Louis L. Ferstandig, El Cerrito, Calif., assignor to California Research Corporation, San Francisco, Calif., a corporation of Delaware No Drawing. Application October 4, 1954
Serial No. 460,261

5 Claims. (Cl. 260—75)

The present invention relates to the preparation of diisocyanate modified synthetic polyesters having elastomeric, rubber-like qualities. More particularly, the invention has to do with the preparation of an intermediate stage diisocyanate modified polyester which remains fusible or plastic, and hence workable, for a prolonged period of time.

In general, three stages or steps are involved in the preparation of the materials contemplated by the invention. These are:

(1) Esterification of a glycol, e. g., ethylene glycol, and a dibasic acid, e. g., adipic, to produce a polyester of wax-like or syrupy consistency, generally having a molecular weight from about 1500 to 3000, ordinarily around 2000;

(2) Chain lengthening of the polyester of (1) with a diisocyanate to form the polyester diisocyanate; and (3) Cross-linking or development of a network, by reacting (2) with a polyfunctional reagent, e. g., water, amino-alcohol, etc.

Illustrative of the type of diisocyanate modified polyesters contemplated herein are U. S. Patents 2,621,166 and 2,625,532, hereby incorporated by reference to the extent pertinent.

In the carrying out of the above steps, three stages or states of modified polymer formation are noted. The first fluid state of the polyester gradually slides into a second plastic or fusible deformable state or condition and finally to an infusible, elastic solid material insoluble in the ordinary solvents. Existence of the material in the plastic, deformable state is of short duration, because of cross-linking of the polymer chain. As a result crumbly products are produced which have to be worked into the desired rubbery structures, that is, milled, sheeted or calendered within a few hours before the final degree of cross-linking or vulcanization sets in. Improvements in the inhibition of the cross-linking of the isocyanate-polyester chain, whereby the workable, deformable plastic state of the material is prolonged, have been proposed, but these are of the order only of a few days. A disadvantage therefore of the prior art materials is the fact that storage for a long period of time and shipment of unfinished material to distant points for further treatment are limited.

I have now found that diisocyanate modified polyesters having a prolonged plastic or fusible intermediate state can be prepared by the use of certain aromatic diisocyanates, in place of the diisocyanates previously employed. I have found that the use of diisocyanate material selected from the group consisting of meta-xylylene diisocyanate, para-xylylene diisocyanate and a 5-alkyl-1,3-xylylene diisocyanate, such as 5-tertiarybutyl-1,3-xylylene diisocyanate, unexpectedly results in the formation of an intermediate diisocyanate-modified polyester which can be stored at room temperatures for periods of time exceeding a month before going into the infusible, insoluble state. These diisocyanates can be prepared in conventional manner from the corresponding diamines and phosgene according to the general reaction:

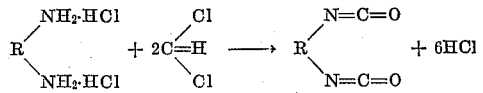

The diamines in turn are prepared from the corresponding dicarboxylic acid through standard dinitrile formation followed by reduction of the dinitrile.

Of the specific diisocyanates mentioned above, the 5-tertiarybutyl-1,3-xylylene diisocyanate is definitely to be preferred, since in addition to imparting superior storage characteristics to the material it is also responsible for a final product having a lowered softening point; that is, it produces an elastic rubbery product, which remains pliable and non-brittle at lowered temperatures. Other less desirably employed 5-alkyl-1,3-xylylene diisocyanates, over and above 5-tertiarybutyl-1,3-xylylene diisocyanate, are those in which the alkyl group preferably contains 1 to 8 carbon atoms, and more desirably 4 carbon atoms, and in branched chain structure as represented by 5-tertiarybutyl-1,3-xylylene diisocyanate.

The following examples are given to illustrate the practice of the invention:

*Example 1*

A. Adipic acid, ethylene glycol and propylene glycol in molar ratios of 8, 5.7 and 3.8, respectively, were employed in the preparation of the polyester. The ingredients were heated in conventional fashion at a gradually rising temperature (about 160° C. to 220° C.) with water distilling off until a polyester with an acid number of 3 and a hydroxyl number of 59 was obtained.

B. The polyester obtained from A was freed of atmospheric moisture by heating to 120–130° C. at 10 mm., after which meta-xylylene diisocyanate was added in the proportion of 0.725 mol per 0.525 mol of polyester.

Heating was continued at 130° C. for 8 hours. A polyester was obtained which had excellent processing characteristics on a rubber mill and which retained these good processing characteristics after a month's storage under a moisture-free atmosphere.

*Example 2*

Polyester obtained as in A of Example 1 was treated with 1,5-naphthalene diisocyanate, a well-known isocyanate for the preparation of Vulcollan type rubbers, in the same fashion and in same amounts as B of Example 1. A polymer was obtained which after 12 hours could no longer be processed on a rubber mill. Similar results are obtained with either m-toylylene diisocyanate or p,p'-diisocyanate diphenyl methane.

*Example 3*

Para-xylylene diisocyanate was employed in place of meta-xylylene diisocyanate of Example 1. A polymer was obtained which could still be processed after a month's storage.

*Example 4*

Example 1 was repeated employing 5-tertiarybutyl-1,3-xylylene diisocyanate in place of meta-xylylene diisocyanate. A polymer was obtained which was plastic, deformable and workable after a month's storage under a moisture-free atmosphere at room temperature. This polymer also remained pliable and non-brittle when cooled below 20° C.

When the polymers, obtained as in B of Example 1, are further heated or treated with a polyfunctional cross-linking agent, e. g., water, highly elastic rubber products are obtained which have desirable properties, including good structural strength, high tensile strength, and good abrasion characteristics.

In carrying out the invention known methods and materials, except for the use of the diisocyanates above listed, can be employed. Thus, the polyesters can be prepared by heating a glycol and acid material consisting mainly of a saturated aliphatic dicarboxylic acid at a temperature between about 100–250° C. Following the preparation of the ester and prior to reaction of the polyester with the diisocyanate, the polyester is rid of water, and this may be accomplished by heating the polyester under vacuum to a temperature between about 100° C. and 150° C. or by heating at this temperature while passing an inert gas through the mixture. The moisture-free polyester is then made to react with the diisocyanate at a temperature between about 75° C. and 150° C. The so-modified polyester can then further be made to react with a polyfunctional compound to effect the final cure of the composition.

In the preparation of the unmodified polyesters there may be employed any dicarboxylic acid of three or more carbon atoms, such as malonic, succinic, glutaric, adipic, pimelic, suberic, azelaic and sebacic. As is known, the aforesaid saturated aliphatic dibasic acids may be replaced in part by unsaturated acids, e. g., fumaric or maleic; by aromatic acids, e. g., isophthalic or terephthalic; substituted or hydroxy acids, e. g., tartaric; and analogues, e. g., thiodibutyric.

As glycols may be mentioned, in addition to ethylene glycol and 1,2-propylene glycol, which are the preferred materials, 1,3-propylene glycol, diethylene glycol, methylhexane-1,6-diol, 1,6-hexane diol, 1,4-butene diol, diethylene, triethylene, butylene, pentamethylene, hexamethylene glycols and higher glycols.

In effecting the esterification reaction to produce the unmodified polyester, conditions are followed to produce a polyester having as low an acid value as possible, preferably not exceeding 10, and this may be effected by using a slight excess of glycol. In addition, the hydroxyl member of the polyester preferably resides within about the range of 20 to about 80, and more desirably between 40 and 60.

In the preparation of the diisocyanate modified polyester it is preferred to employ an excess of the diisocyanate material to react with all of the hydroxyl groups. Accordingly, a ratio of diisocyanate to polyester of 1 to 2 equivalents, preferably 1.2 to 1.5 of diisocyanate equivalents, per equivalent of polyester represents a satisfactory amount.

As hereinabove mentioned the diisocyanate modified polyester can then be cured or converted into the infusible, insoluble state by heat or reaction with a polyfunctional compound represented by either a glycol, an amino alcohol or a diamine. Examples of these are water, amino ethyl alcohol, ethylene glycol, p,p'-diamino diphenyl methane.

Obviously many modifications and variations of the invention as hereinbefore set forth may be made without departing from the spirit and scope thereof and, therefore, only such limitations should be imposed as are indicated in the appended claims.

I claim:

1. In the process of preparing a diisocyanate modified polyester useful as a synthetic rubber product, which involves first esterifying a glycol and dibasic carboxylic acid to produce a polyester having an acid number below about 10 and a hydroxyl number between about 20 and 80, followed by reaction of the polyester with a diisocyanate to produce an intermediate stage diisocyanate modified polyester existing in a fusible, deformable state, the improvement of prolonging the existence of the fusible, deformable state of said diisocyanate modified polyester, which comprises employing as the diisocyanate a 5-alkyl-1,3-xylylene diisocyanate in which the alkyl group contains 1 to 8 carbon atoms.

2. Process according to claim 1 wherein the 5-alkyl-1,3-xylylene diisocyanate is 5-tertiarybutyl-1,3-xylylene diisocyanate.

3. Process according to claim 2 wherein the dibasic acid material is adipic acid.

4. Process according to claim 3 wherein the glycol is at least one material selected from the group consisting of ethylene glycol and 1,2-propylene glycol.

5. Composition prepared in accordance with claim 4.

References Cited in the file of this patent
UNITED STATES PATENTS

| | | |
|---|---|---|
| 2,374,136 | Rothrock | Apr. 17, 1945 |
| 2,430,479 | Pratt et al. | Nov. 11, 1947 |
| 2,621,166 | Schmidt et al. | Dec. 9, 1952 |
| 2,625,531 | Seeger | Jan. 13, 1953 |
| 2,625,532 | Seeger | Jan. 13, 1953 |